(12) United States Patent
Kyutoku et al.

(10) Patent No.: US 10,437,396 B2
(45) Date of Patent: Oct. 8, 2019

(54) CONDUCTIVE FILM FOR TOUCH PANEL

(71) Applicant: FUJIFILM Corporation, Tokyo (JP)

(72) Inventors: Kuniaki Kyutoku, Kanagawa (JP); Hiroshige Nakamura, Kanagawa (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 301 days.

(21) Appl. No.: 15/452,021

(22) Filed: Mar. 7, 2017

(65) Prior Publication Data

US 2017/0177120 A1 Jun. 22, 2017

Related U.S. Application Data

(63) Continuation of application No. PCT/JP2015/073343, filed on Aug. 20, 2015.

(30) Foreign Application Priority Data

Sep. 8, 2014 (JP) .................. 2014-182519

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04107* (2013.01); *G06F 2203/04112* (2013.01)

(58) Field of Classification Search
CPC . G06F 2203/04103; G06F 2203/04107; G06F 2203/04112; G06F 3/041; G06F 3/044; B82Y 10/00; B32B 27/02
See application file for complete search history.

(56) References Cited

U.S. PATENT DOCUMENTS 9,271,396 B2 2/2016 Nakamura
9,532,491 B2 12/2016 Hashido
(Continued)

FOREIGN PATENT DOCUMENTS

JP 2008-103691 A 5/2008
JP 2008103691 A * 5/2008
(Continued)

OTHER PUBLICATIONS

International Preliminary Report on Patentability with translation of written opinion dated Mar. 9, 2017 issued by the International Bureau in application No. PCT/JP2015/073343.
(Continued)

*Primary Examiner* — Richard J Hong
(74) *Attorney, Agent, or Firm* — Sughrue Mion, PLLC

(57) ABSTRACT

Provided is a conductive film for a touch panel including: an insulating substrate including a pair of surfaces facing each other; a detection electrode pattern portion which is formed of thin metal wires formed on at least one surface of the pair of surfaces of the insulating substrate; a wiring portion which is disposed on the same surface as the surface of the insulating substrate where the detection electrode pattern portion is formed, and includes a plurality of lead-out wirings formed of metal which are connected to the detection electrode pattern portion; and a shielding electrode formed of metal which is disposed on a surface on a side opposite to the surface of the insulating substrate where the wiring portion is disposed and at a position corresponding to the wiring portion, in which the shielding electrode includes a mesh-like pattern portion which is formed of metal wires respectively intersecting with the lead-out wirings of the wiring portion and has an opening ratio equal to or greater than 80%, and has sheet resistance equal to or smaller than 20 Ω/sq.

20 Claims, 8 Drawing Sheets

(56) References Cited

U.S. PATENT DOCUMENTS

| | | | |
|---|---|---|---|
| 2004/0265550 A1* | 12/2004 | Glatkowski | B82Y 10/00 428/209 |
| 2008/0057264 A1* | 3/2008 | Morimoto | B32B 27/02 428/98 |
| 2008/0070003 A1 | 3/2008 | Nakatani et al. | |
| 2014/0176840 A1 | 6/2014 | Hashido | |
| 2014/0299357 A1 | 10/2014 | Nakamura | |

FOREIGN PATENT DOCUMENTS

| | | |
|---|---|---|
| JP | 2010-191504 A | 9/2010 |
| JP | 2010-257178 A | 11/2010 |
| JP | 2012-22427 A | 2/2012 |
| JP | 2012-94115 A | 5/2012 |
| JP | 2012164648 A | 8/2012 |
| JP | 2012-203565 A | 10/2012 |
| JP | 2012203565 A * | 10/2012 |
| JP | 2013-125588 A | 6/2013 |
| JP | 2013-149237 A | 8/2013 |
| JP | 2013246723 A | 12/2013 |
| JP | 2013250706 A | 12/2013 |
| JP | 2014071863 A | 4/2014 |
| JP | 2014-123640 A | 7/2014 |
| JP | 2014-130428 A | 7/2014 |

OTHER PUBLICATIONS

International Search Report of PCT/JP2015/073343 dated Oct. 6, 2015 (PCT/ISA/210).

Communication dated Jun. 19, 2018 from the Japanese Patent Office in counterpart application No. 2017-207352.

Communication dated Aug. 28, 2018 from the Japanese Patent Office in counterpart application No. 2017-207352.

* cited by examiner

CONDUCTIVE FILM FOR TOUCH PANEL

CROSS-REFERENCE TO RELATED APPLICATIONS

This application is a Continuation of PCT International Application No. PCT/JP2015/073343 filed on Aug. 20, 2015, which claims priority under 35 U.S.C. § 119(a) to Japanese Patent Application No. 2014-182519 filed on Sep. 8, 2014. The above application is hereby expressly incorporated by reference, in its entirety, into the present application.

BACKGROUND OF THE INVENTION

1. Field of the Invention

The present invention relates to a conductive film for a touch panel and particularly relates to a conductive film used in a capacitive touch panel.

2. Description of the Related Art

In recent years, touch panels which are used in combination with display devices such as liquid crystal display devices and perform an input operation to electronic device by coming into contact with a screen, in various electronic devices such as portable information devices have come into wide use.

The touch panels are classified into resistive membrane type, capacitive type, infrared type, ultrasonic type, and electromagnetic induction coupling type touch panels depending on operating principles thereof, and capacitive touch panels having high transmittance and excellent durability are particularly attracting attention.

JP2010-257178A, for example, discloses a touch panel in which a detection electrode pattern portion is formed on a transparent substrate and a plurality of lead-out wirings are led out from the detection electrode pattern portion to a plurality of external connection terminals which are disposed on an edge of the transparent substrate. In the touch panel disclosed in JP2010-257178A, a shield film in which a transparent shielding electrode is formed is disposed on the transparent substrate through a pressure sensitive adhesive layer, in order to prevent effects applied to operations of the touch panel due to electromagnetic wave noise radiated from a liquid crystal display device or the like used in combination with the touch panel.

SUMMARY OF THE INVENTION

It is required to provide thin touch panels having a three-dimensional shape, while the improvement of portability and operability of electronic devices is required. Therefore, the development of a conductive film for a touch panel in which detection electrodes formed of thin metal wires are formed on a flexible transparent insulating substrate has proceeded. In this type of conductive film for a touch panel, it is desired that lead-out wirings formed of metal are formed on a front surface of the insulating substrate at the same time as the formation of the detection electrodes, and shielding electrodes formed of metal are formed on a rear surface of the insulating substrate and at positions corresponding to the lead-out wirings.

Along with the miniaturization of electronic devices, lead-out wirings having a small line width are used, and in order to confirm that disconnection has not occurred, an operation of irradiating the conductive film for a touch panel with illumination light and visually inspecting a shape of lead-out wirings using the transmitted light is performed.

However, as shown in FIG. 19, when a shielding electrode 3 formed of metal having no openings is disposed on the rear surface of the insulating substrate 1 to correspond to the lead-out wirings 2 formed on the front surface of the insulating substrate 1, in order to increase shielding effect, the shielding electrode 3 does not transmit light, and thus, it is difficult to inspect the shape of the lead-out wirings using transmitted light.

The invention is made to address the aforementioned problems of the related art and an object thereof is to provide a conductive film for a touch panel in which a shape of lead-out wirings is visually inspected using transmitted light, while disposing shielding electrodes formed of metal to correspond to lead-out wirings.

According to the invention, there is provided a conductive film for a touch panel comprising: an insulating substrate including a pair of surfaces facing each other; a detection electrode pattern portion which is formed of thin metal wires formed on at least one surface of the pair of surfaces of the insulating substrate; a wiring portion which is disposed on the same surface as the surface of the insulating substrate where the detection electrode pattern portion is formed, and includes a plurality of lead-out wirings formed of metal which are connected to the detection electrode pattern portion; and a shielding electrode formed of metal which is disposed on a surface on a side opposite to the surface of the insulating substrate where the wiring portion is disposed and at a position corresponding to the wiring portion, in which the shielding electrode includes a mesh-like pattern portion which is formed of metal wires respectively intersecting with the lead-out wirings of the wiring portion and has an opening ratio equal to or greater than 80%, and has sheet resistance equal to or smaller than 20 Ω/sq.

It is preferable that the shielding electrode has an opening ratio in a unit area having a width of 15 μm from the side edge of the lead-out wirings to a portion of the outer side and a length of 300 μm along the lead-out wirings which is greater than 80%.

It is preferable that the metal wires configuring the mesh-like pattern portion have a line width smaller than a line width of each of the lead-out wirings of the wiring portion. In addition, it is preferable that the metal wires configuring the mesh-like pattern portion have a line width greater than a line width of the thin metal wires forming the detection electrode pattern portion.

The metal wires configuring the mesh-like pattern portion can have a line width of 5 to 20 μm.

In a case where a pair of lead-out wirings of the wiring portion adjacent to each other have a gap equal to or greater than 60 μm, the shielding electrode may further include a linear pattern portion extending in parallel with the pair of lead-out wirings and disposed at a position corresponding to the center of the pair of lead-out wirings.

It is preferable that the linear pattern portion is formed of metal wires having a width of 5 to 15 μm.

The detection electrode pattern portion and the wiring portion may be respectively formed on a front surface and a rear surface of the insulating substrate, the shielding electrode corresponding to respective lead-out wirings of the wiring portion formed on the front surface of the insulating substrate may be formed on the rear surface of the insulating substrate, and the shielding electrode corresponding to respective lead-out wirings of the wiring portion formed on the rear surface of the insulating substrate may be formed on the front surface of the insulating substrate.

In this case, it is preferable that the shielding electrode has a thickness which is the same as that of the detection electrode pattern portion formed on the same surface of the insulating substrate, and it is preferable that the shielding electrode is formed of a material which is the same as that of the detection electrode pattern portion formed on the same surface of the insulating substrate.

According to the invention, the shielding electrode includes the mesh-like pattern portion which is formed of metal wires respectively intersecting with the lead-out wirings of the wiring portion and has an opening ratio equal to or greater than 80%, and has sheet resistance equal to or smaller than 20 Ω/sq, and therefore, it is possible to visually inspect the shape of the lead-out wirings using transmitted light while disposing the shielding electrodes formed of metal to correspond to the lead-out wirings.

DESCRIPTION OF THE PREFERRED EMBODIMENTS

Hereinafter, embodiments of the invention will be described with reference to accompanying drawings.

Embodiment 1

Figure 1:
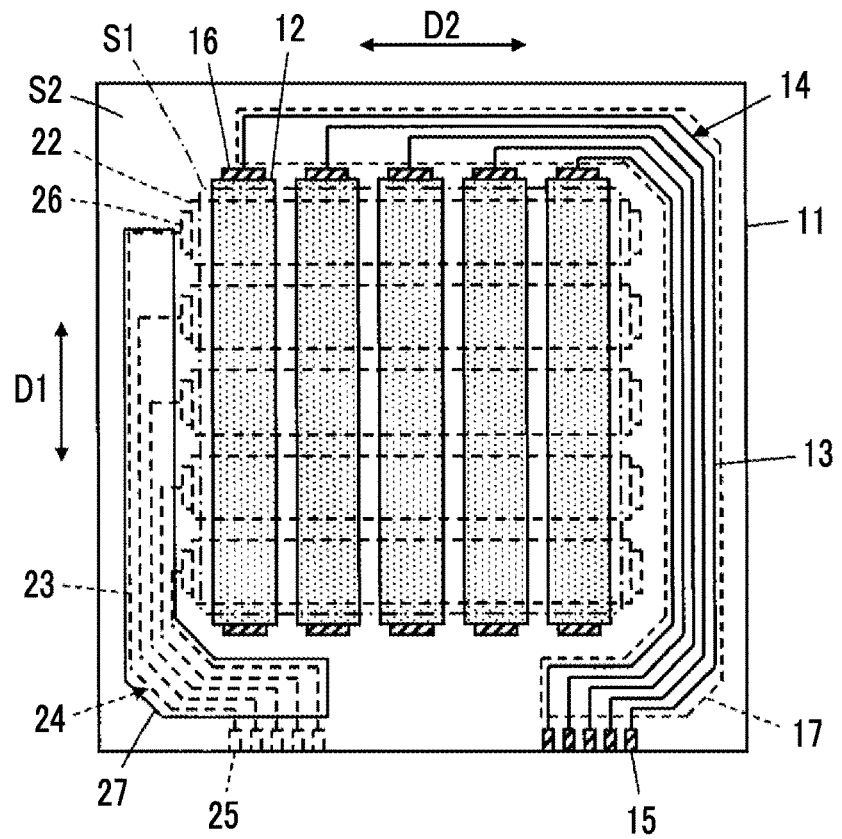
FIG. 1 is a plan view showing a conductive film for a touch panel according to Embodiment 1 of the invention.

FIG. 1 shows a configuration of a conductive film for a touch panel according to Embodiment 1 of the invention. This conductive film for a touch panel includes a rectangular flexible and transparent insulating substrate 11, the insulating substrate 11 is partitioned into a sensing area S1 which is at the center of the insulating substrate 11, and a peripheral area S2 which is on the outer side of the sensing area S1.

On the front surface of the insulating substrate 11, a plurality of first detection electrodes 12 which are respectively extended along a first direction D1 and disposed in parallel with a second direction D2 orthogonal to the first direction D1 are formed in the sensing area S1, and a first wiring portion 14 is formed in the peripheral area S2 by arranging a plurality of first lead-out wirings 13 corresponding to the plurality of first detection electrodes 12 to be adjacent to each other. A plurality of first external connection terminals 15 corresponding to the plurality of first detection electrodes 12 are arranged on the edge of the insulating substrate 11.

First connector portions 16 are formed on both ends of each first detection electrode 12. One end of the first lead-out wiring 13 is connected to one of the corresponding first connector portion 16 and the other end of the first lead-out wiring 13 is connected to the corresponding first external connection terminal 15.

In the same manner as described above, on the rear surface of the insulating substrate 11, a plurality of second detection electrodes 22 which are respectively extended along the second direction D2 and disposed in parallel with the first direction D1 are formed in the sensing area S1, and a second wiring portion 24 is formed in the peripheral area S2 by arranging a plurality of second lead-out wirings 23 corresponding to the plurality of second detection electrodes 22 to be adjacent to each other. A plurality of second external connection terminals 25 corresponding to the plurality of second detection electrodes 22 are arranged on the edge of the insulating substrate 11.

Second connector portions 26 are Rained on both ends of each second detection electrode 22. One end of the second lead-out wiring 23 is connected to one of the corresponding second connector portion 26 and the other end of the second lead-out wiring 23 is connected to the corresponding second external connection terminal 25.

A first shielding electrode 17 is formed on a rear surface of the insulating substrate 11 on a side opposite to the front surface of the insulating substrate 11 where the first wiring portion 14 is disposed and at a position corresponding to the first wiring portion 14. A second shielding electrode 27 is formed on the front surface of the insulating substrate 11 on a side opposite to the rear surface of the insulating substrate 11 where the second wiring portion 24 is disposed and at a position corresponding to the second wiring portion 24. In FIG. 1, the first shielding electrode 17 and the second shielding electrode 27 are not provided at a position corresponding to the external connection terminals 15 and 25, but may be extended to the position corresponding to the external connection terminals 15 and 25.

The plurality of first lead-out wirings 13 and the plurality of second lead-out wirings 23 are respectively formed of metal and the first shielding electrode 17 and the second shielding electrode 27 are also formed of metal.

Figure 2:
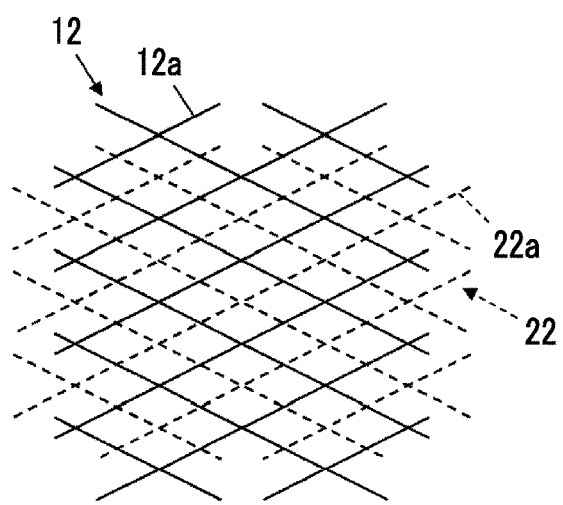
FIG. 2 is a partial plan view showing detection electrodes of the conductive film for a touch panel according to Embodiment 1.

As shown in FIG. 2, the first detection electrode 12 disposed on the front surface of the insulating substrate 11 is preferably formed with a mesh pattern formed of thin metal wires 12a and the second detection electrode 22 disposed on the rear surface of the insulating substrate 11 is also preferably formed with a mesh pattern formed of thin metal wires 22a.

Figure 3:
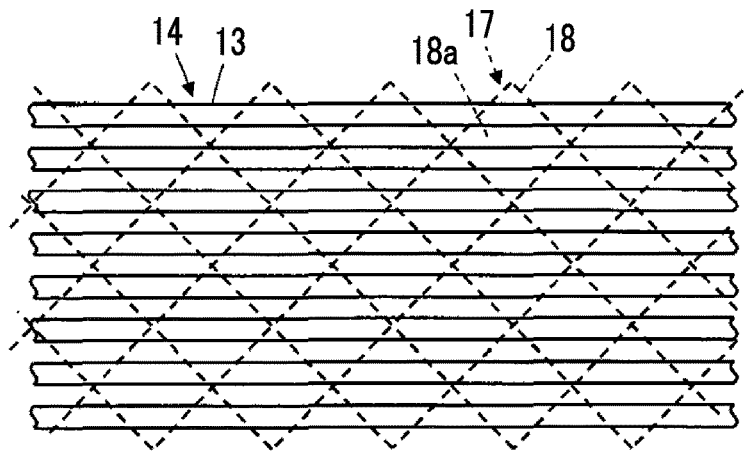
FIG. 3 is a partial plan view showing a relationship between a first wiring portion and a first shielding electrode of the conductive film for a touch panel according to Embodiment 1.

As shown in FIG. 3, the first shielding electrode 17 is disposed at a position overlapped with the plurality of first lead-out wirings 13 configuring the first wiring portion 14 with the insulating substrate 11 interposed therebetween, and includes a mesh-like pattern portion 18 formed of metal wires and rectangular openings 18a between the meshes. The metal wires forming the mesh-like pattern portion 18 respectively intersect with the first lead-out wirings 13 of the first wiring portion 14 by a predetermined angle, for example, an angle of 45 degrees.

Figure 4:
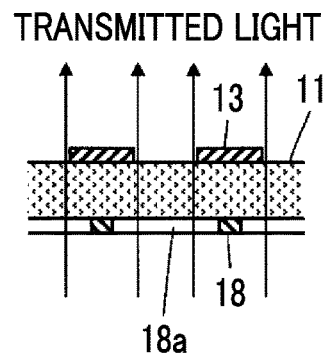
FIG. 4 is a partial cross section view showing a state of shape inspection of lead-out wirings of the first wiring portion.

As described above, the first shielding electrode 17 includes the mesh-like pattern portion 18 formed of metal wires intersecting with the first lead-out wirings 13 by a predetermined angle. Accordingly, as shown in FIG. 4, when illumination light is emitted from a rear surface side of the insulating substrate 11, the illumination light transmits through the front surface side of the insulating substrate 11 via the openings 18a of the mesh-like pattern portion 18 of the first shielding electrode 17 and the transparent insulating substrate 11. Therefore, it is possible to visually inspect the shape of the first lead-out wirings 13 using transmitted light.

Figure 5:
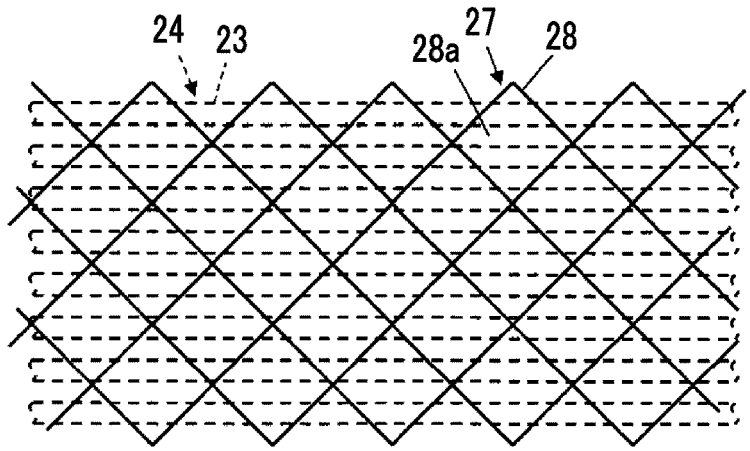
FIG. 5 is a partial plan view showing a relationship between a second wiring portion and a second shielding electrode of the conductive film for a touch panel according to Embodiment 1.

As shown in FIG. 5, in the same manner as in the case of the first shielding electrode 17, the second shielding electrode 27 is also disposed at a position overlapped with the plurality of second lead-out wirings 23 configuring the second wiring portion 24 with the insulating substrate 11 interposed therebetween, and includes a mesh-like pattern portion 28 formed of metal wires and rectangular openings 28a between the meshes. The metal wires forming the mesh-like pattern portion 28 respectively intersect with the second lead-out wirings 23 of the second wiring portion 24 by a predetermined angle, for example, an angle of 45 degrees.

Figure 6:
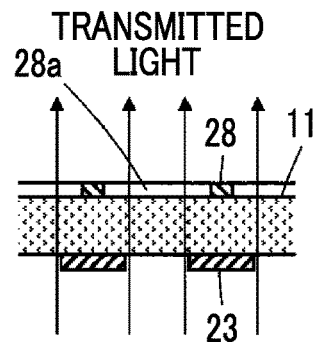
FIG. 6 is a partial cross section view showing a state of shape inspection of lead-out wirings of the second wiring portion.

Accordingly, as shown in FIG. 6, when illumination light is emitted from a rear surface side of the insulating substrate 11, the illumination light which has transmitted through portions between the second lead-out wirings 23 adjacent to each other further transmits through the front surface side of the insulating substrate 11 via the transparent insulating substrate 11 and the openings 28a of the mesh-like pattern portion 28 of the second shielding electrode 27. Therefore, it is also possible to visually inspect the shape of the second lead-out wirings 23 using transmitted light.

It is preferable that the first lead-out wirings 13 and the second lead-out wirings 23 have line widths of, for example, 20 to 40 μm, whereas the metal wires forming the mesh-like pattern portion 18 of the first shielding electrode 17 and the metal wires forming the mesh-like pattern portion 28 of the second shielding electrode 27 have line widths of 5 to 20 μm, which is smaller than the line width of the first lead-out wirings 13 and the second lead-out wirings 23. It is preferable that, the line widths of the metal wires forming the mesh-like pattern portion 18 of the first shielding electrode 17 and the metal wires forming the mesh-like pattern portion 28 of the second shielding electrode 27 are set as values greater than the line widths of the thin metal wires 12a forming the first detection electrode 12 and the thin metal wires 22a forming the second detection electrode 22.

The shape of the openings between meshes is not limited to a rectangle, and may be an equilateral triangle, a square, a regular hexagon, other regular polygons, or a polygon having a random shape, or can be a shape including curves.

The plurality of first detection electrodes 12, the plurality of first lead-out wirings 13, and the second shielding electrode 27 disposed on the front surface of the insulating substrate 11 can be formed in the same step at the same time. In the same manner as described above, the plurality of second detection electrodes 22, the plurality of second lead-out wirings 23, and the first shielding electrode 17 disposed on the rear surface of the insulating substrate 11 can also be formed in the same step at the same time. In this case, the second shielding electrode 27 is formed of a material and to have a thickness which are the same as those of the first detection electrodes 12 and the first lead-out wirings 13 disposed on the front surface of the same insulating substrate 11, and in the same manner as described above, the first shielding electrode 17 is also formed of a material and to have a thickness which are the same as those of the second detection electrodes 22 and the second lead-out wirings 23 disposed on the rear surface of the same insulating substrate 11.

The first shielding electrode 17 and the second shielding electrode 27 can be formed of silver paste, in order to decrease a sheet resistance value.

Here, it is desired that the mesh-like pattern portions 18 and 28 have opening ratios Rm equal to or greater than 80%, in order to perform inspection by visually confirming, the shape of the first lead-out wirings 13 through the openings 18a of the mesh-like pattern portion 18 of the first shielding electrode 17 and by visually confirming the shape of the second lead-out wirings 23 through the openings 28a of the mesh-like pattern portion 28 of the second shielding electrode 27.

Figure 7:
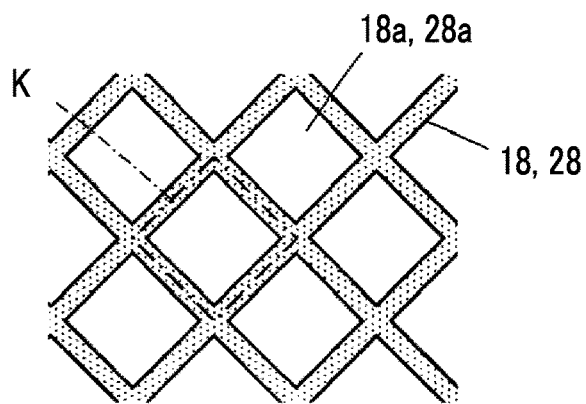
FIG. 7 is a partially enlarged plan view of a mesh-like pattern portion of the first and second shielding electrodes.

The opening ratios Rm of the mesh-like pattern portions 18 and 28 indicate proportions of areas of the openings 18a and 28a, where metal wires are not present, occupying the total area of a rectangular area K, in the rectangular area K which is surrounded by center lines of metal wires coming into contact with four sides of the rectangular openings 18a and 28a, as shown in FIG. 7. That is, when the mesh-like pattern portions 18 and 28, in which 80% or greater of portions in the rectangular area K can be seen without being shielded by metal wires, are disposed at positions overlapped with the plurality of plurality of first lead-out wirings 13 and the plurality of second lead-out wirings 23, it is easy to visually confirm side edges of the first lead-out wirings 13 and the second lead-out wirings 23.

Figure 8:
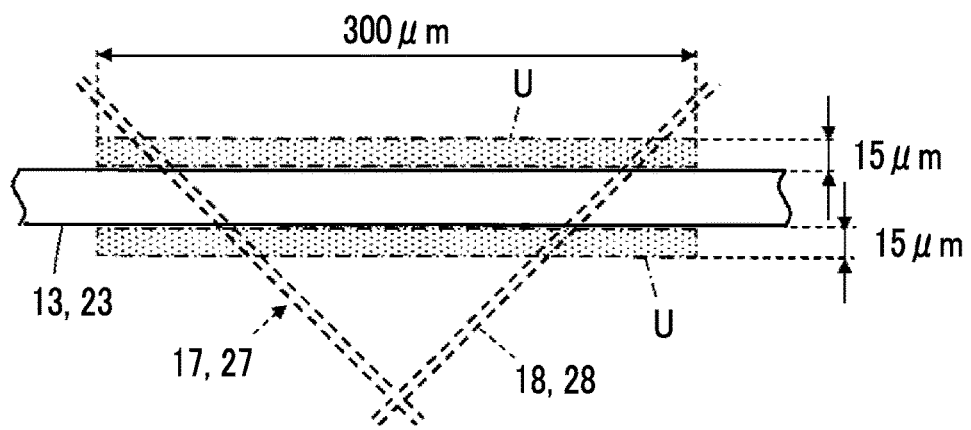
FIG. 8 is a partially enlarged plan view of main parts of the first wiring portion and the second wiring portion of the conductive film for a touch panel according to Embodiment 1.

As shown in FIG. 8, a unit area U having a width from the side edge of the first lead-out wirings 13 and the second lead-out wirings 23 to a portion separated therefrom to the outer side by 15 μm, and a length of 300 μm along a length direction of the first lead-out wirings 13 and the second lead-out wirings 23 is assumed, and the first shielding electrode 17 and the second shielding electrode 27 in this unit area U preferably have opening ratios Rs exceeding 80%.

Here, the opening ratios Rs of the first shielding electrode 17 and the second shielding electrode 27 indicate proportions of areas of the mesh-like pattern portions 18 and 28 in the unit area U, where metal wires are not present, occupying the total area of the unit area U. That is, when 80% or greater of portions in the unit area U can be seen without being shielded by metal wires of the mesh-like pattern portions 18 and 28, it is possible to perform inspection of shapes by confirming side edges of the first lead-out wirings 13 and the second lead-out wirings 23 using transmitted light.

The unit area U may be set at only one location along the length direction of the first lead-out wirings 13 and the second lead-out wirings 23, but in a case where the unit areas U are set at arbitrary locations along the length direction of the first lead-out wirings 13 and the second lead-out wirings 23, the first shielding electrode 17 and the second shielding electrode 27 preferably have the opening ratios Rs exceeding 80% in any location. Alternatively, the first shielding electrode 17 and the second shielding electrode 27 may be formed so that an average value of the opening ratios Rs in a plurality of unit areas U set at a plurality of locations exceeds 80%.

In order to obtain a shielding effect equal to or greater than 50 dB with the first shielding electrode 17 and the second shielding electrode 27, it is necessary that the first shielding electrode 17 and the second shielding electrode 27 have sheet resistance equal to or smaller than 20 $\Omega$/sq. Here, when the proportions of areas of the mesh-like pattern portions 18 and 28, where metal wires are present, are decreased in order to increase the opening ratios Rm of the mesh-like pattern portions 18 and 28, sheet resistance of the first shielding electrode 17 and the second shielding electrode 27 increases and the shielding effect decreases due to the decrease above.

Therefore, a line width, a thickness, a pattern pitch, and the like of the metal wires of the mesh-like pattern portions 18 and 28 are selected so that the mesh-like pattern portions 18 and 28 have the opening ratios Rm equal to or greater than 80% and the first shielding electrode 17 and the second shielding electrode 27 have sheet resistance equal to or smaller than 20 $\Omega$/sq, in order to obtain a predetermined shielding effect while maintaining visibility of the first lead-out wirings 13 and the second lead-out wirings 23.

A manufacturing method of such a conductive film for a touch panel is not particularly limited, and a method including a step (1) of forming silver halide emulsion layers (hereinafter, also simply referred to as photosensitive layers) including silver halide and a binder on both surfaces of the insulating substrate 11, and a step (2) of exposing the photosensitive layers to light and performing a development process is used.

Hereinafter, each step will be described.

<Step (1): Photosensitive Layer Formation Step>

The step (1) is a step of forming photosensitive layers including silver halide and a binder on both surfaces of the insulating substrate 11.

A method of forming the photosensitive layer is not particularly limited, and a method of forming photosensitive layers on both surfaces of the insulating substrate 11 by bringing a composition for forming a photosensitive layer including silver halide and a binder into contact with the insulating substrate 11 is preferably used, from a viewpoint of productivity.

Hereinafter, the aspect of the composition for forming a photosensitive layer used in the method will be described and then the procedure of the step will be described.

The composition for forming a photosensitive layer includes silver halide and a binder.

A halogen element included in silver halide may be any of chlorine, bromine, iodine, and fluorine or may be a combination thereof. As silver halide, silver halide using silver chloride, silver bromide, and silver iodide as main substances is preferably used, for example, and silver halide using silver bromide or silver chloride as a main substance is more preferably used.

The kind of binder used is not particularly limited, and a well-known polymer can be used. For example, a water-soluble binder (water-soluble polymer) may be used. Specific examples thereof include gelatin, carrageenan, polyvinyl alcohol (PVA), polyvinyl pyrrolidone (PVP), polysaccharide such as starch, cellulose and a derivative thereof, polyethylene oxide, polysaccharide, polyvinylamine, chitosan, polylysine, polyacrylic acid, polyarginic acid, polyhyaluronic acid, carboxycellulose, gum arabic, and sodium alginate. In addition, the binder may be included in the composition for forming a photosensitive layer in a form of latex.

A volume ratio between the silver halide and the binder included in the composition for forming a photosensitive layer is not particularly limited, and suitably adjusted so that a volume ratio between metal and a binder in the thin metal wires 12a and 22a described above is in a suitable range.

The composition for forming a photosensitive layer includes a solvent, if necessary.

Examples of the solvent used include water, an organic solvent (for example, alcohols such as methanol, ketones such as acetone, amides such as formamide, sulfoxides such as dimethylsulfoxide, esters such as ethyl acetate, or ethers), ionic liquid, or a mixed solvent thereof.

A content of the solvent used is not particularly limited, and is preferably in a range of 30% to 90% by mass and more preferably in a range of 50% to 80% by mass with respect to the total mass of the silver halide and the binder.

(Procedure of Step)

A method of bringing the composition for forming a photosensitive layer into contact with the insulating substrate 11 is not particularly limited and a well-known method can be used. A method of applying the composition for forming a photosensitive layer onto the insulating substrate 11 or a method of dipping the insulating substrate 11 into the composition for forming a photosensitive layer is used, for example.

A content of the binder in the photosensitive layer formed is not particularly limited and is preferably 0.3 to 5.0 g/m$^2$ and more preferably 0.5 to 2.0 g/m$^2$.

A content of the silver halide in the photosensitive layer formed is not particularly limited and is preferably 1.0 to 20.0 g/m$^2$ and more preferably 5.0 to 15.0 g/m$^2$ in terms of silver, in order to have more excellent conduction characteristics of thin metal wires 34.

A protective layer formed of a binder may be further provided on the photosensitive layer, if necessary. When a protective layer is provided, scratches are prevented and mechanical characteristics are improved.

<Step (2): Exposure and Development Step>

The step (2) is a step of performing pattern exposure and a development process regarding the photosensitive layer obtained in the step (1) to form the first detection electrodes 12, the first lead-out wirings 13, the first external connection terminals 15, the first connector portions 16, the second shielding electrode 27, the second detection electrodes 22, the second lead-out wirings 23, the second external connection terminals 25, the second connector portions 26, and the first shielding electrode 17.

First, hereinafter, a pattern exposure process will be described and then a development process will be described.

(Pattern Exposure)

When pattern exposure is performed with respect to the photosensitive layer, the silver halide in the photosensitive layer in the exposed area forms a latent image. In the area where the latent image is formed, thin metal wires are formed by the development process which will be described later. Meanwhile, in a non-exposed area in which the exposure was not performed, the silver halide is melted and flows out of the photosensitive layer at the time of a fixing process which will be described later, and a transparent film is obtained.

A light source used at the time of the exposure is not particularly limited, and light such as visible light or ultraviolet light, or radioactive rays such as X rays is used.

A method of performing the pattern exposure is not particularly limited, and the pattern exposure may be performed by surface exposure using a photo mask or may be performed by scanning exposure using laser beams, for example. The shape of pattern is not particularly limited and suitably adjusted in accordance with the pattern of thin metal wires desired to be formed.

(Development Process)

A method of performing the development process is not particularly limited and a well-known method can be used. A technology of a typical development process used in a silver halide photographic film, printing paper, a film for plate printing, or an emulsion mask for a photo mask can be used, for example.

The kind of a developer used when performing the development process is not particularly limited and a PQ developer, a MQ developer, or a MAA developer can be used. As commercially available products, developers such as CN-16, CR-56, CP45X, FD-3, or PAPITOL manufactured by Fujifilm Corporation, C-41, E-6, RA-4, D-19, or D-72 manufactured by Kodak, or a developer included in the kit thereof can be used. A lithographic developing solution can also be used.

The development process can include a fixing process which is performed for stabilization by removing silver salt in a non-exposed portion. In the fixing process, a technology of a fixing process used in a silver halide photographic film, printing paper, a film for plate printing, or an emulsion mask for a photo mask can be used.

A fixing temperature in the fixing process is preferably approximately 20° C. to approximately 50° C. and more preferably 25° C. to 45° C. The fixing time is preferably 5 seconds to 1 minute and more preferably 7 seconds to 50 seconds.

The mass of metal silver included in the exposed portion (thin metal wires) after the development process is preferably a content equal to or greater than 50% by mass and more preferably a content equal to or greater than 80% by mass with respect to mass of silver included in the exposed portion before the exposure. It is preferable that the mass of silver included in the exposed portion is equal to or greater than 50% by mass with respect to the mass of silver included in the exposed portion before the exposure, because high conductivity can be obtained.

in addition to the steps described above, an undercoat formation step, an antihalation layer formation step, a heating process, or a de-binder process which will be described below may be performed, if necessary.

(Undercoat Formation Step)

It is preferable to perform a step of forming an undercoat including the predetermined compound described above on the front surface of the insulating substrate 11 before the step (1), in order to have excellent adhesiveness between the insulating substrate 11 and the silver halide emulsion layer.

(Antihalation Layer Formation Step)

It is preferable to perform a step of forming antihalation layers on both surfaces of the insulating substrate 11 before the step (1), in order to perform thinning of the thin metal wires 12a and 22a.

<Step (3): Heating Step>

A step (3) is performed if necessary, and is a step of performing a heating process after the development process. When this step is performed, fusion occurs between the binders and hardness of the thin metal wires 12a and 22a further increases. Particularly, in a case where polymer particles are dispersed in the composition for forming a photosensitive layer as a binder (in a case where a binder is polymer particles in latex), fusion occurs between the polymer particles and the thin metal wires 12a and 22a having desired hardness are formed, by performing this step.

For conditions of the heating process, suitable and preferable conditions are selected depending on the binder used, and a temperature is preferably equal to or higher than 40° C., from a viewpoint of a film forming temperature of the polymer particles, more preferably equal to or higher than 50° C., and even more preferably equal to or higher than 60° C. In addition, the temperature thereof is preferably equal to lower than 150° C. and more preferably equal to lower than 100° C., from a viewpoint of preventing curling of a substrate.

A heating time is not particularly limited, and is preferably 1 to 5 minutes and more preferably 1 to 3 minutes, from viewpoints of preventing curling of a substrate and productivity.

In this heating process, normally a drying step performed after the exposure and development process can be performed, and accordingly, it is not necessary to increase a new step for forming a film with the polymer particles. Thus, the process is excellent from viewpoints of productivity and cost.

<Step (4): De-Binder Process Step>

The de-binder process step is a step of performing further treatment with respect to the insulating substrate 11 including thin metal wires with a proteolytic enzyme or an oxidant such as oxoacid for decomposing a water-soluble binder such as gelatin. When this step is performed, a water-soluble binder such as gelatin is decomposed and removed from the photosensitive layer subjected to the exposure and development process and ionic migration between thin metal wires is prevented.

Hereinafter, first materials used in this step will be described and then procedure of this step will be described.

(Proteolytic Enzyme)

As the proteolytic enzyme (hereinafter, also referred to as an enzyme), a well-known vegetable enzyme or animal enzyme capable of performing hydrolysis of protein such as gelatin is used. Examples thereof include pepsin, renin, trypsin, chymotrypsin, cathepsin, papain, ficin, thrombin, renin, collagenase, bromelain, and bacterial protease. Among these, trypsin, papain, ficin, and bacterial protease are particularly preferable. Among these, bacterial protease (for example, BIOPRASE manufactured by Nagase ChemteX Corporation) is commercially available at low cost and can be easily purchased.

(Oxidant)

As the oxidant, a well-known oxidant capable of performing oxidative decomposition of protein such as gelatin is used. Examples thereof include halogen oxoacid salt such as hypochlorite, chlorite, or chlorate. Among these, sodium hypochlorite is commercially available at low cost and can be easily purchased.

(Procedure of Step)

The procedure of the de-binder process step is not particularly limited, as long as the insulating substrate 11 including thin metal wires is brought into contact with the enzyme or the oxidant. As a contact method, a method of applying treatment liquid onto the insulating substrate 11 including thin metal wires or a method of dipping the insulating substrate 11 including thin metal wires in treatment liquid is used, for example.

A content of the enzyme in the treatment liquid is not particularly set and can be arbitrarily determined depending on ability of the enzyme used and performance required. The content of the enzyme is suitably approximately 0.05% to 20% by mass and more preferably 5% to 10% by mass with respect to the total amount of the treatment liquid, from a viewpoint of controlling a degree of decomposition and removal of gelatin.

In addition to the enzyme, a buffer for pH, an antibacterial compound, a wetting agent, or a preservative can be included in this treatment liquid, if necessary.

The pH of the treatment liquid is selected by performing an experiment, so that a maximum degree of the action of the enzyme is obtained, and is generally preferably 5 to 7. The temperature of the treatment liquid is also preferably a temperature where a degree of the action of the enzyme is increased, which is specifically 25° C. to 45° C.

The contact time is not particularly limited, and is preferably 10 to 500 seconds and more preferably 90 to 360 seconds, from a viewpoint of further improving prevention ability of ionic migration of a conductive portion.

In addition, a step of washing the insulating substrate 11 including thin metal wires using warm water after the process using the treatment liquid, may be provided, if necessary. When this step is performed, gelatin decomposition residues and residues of the proteolytic enzyme or residual oxidant can be removed and ionic migration is further prevented.

A washing method is not particularly limited, as long as the insulating substrate 11 including thin metal wires can be brought into contact with warm water. A method of dipping the insulating substrate 11 including thin metal wires in warm water or a method of applying warm water onto the insulating substrate 11 including thin metal wires is used, for example.

As a temperature of warm water, a suitable and optimal temperature is selected depending on the kind of the proteolytic enzyme used, and is preferably 20° C. to 80° C. and more preferably 40° C. to 60° C., from a viewpoint of productivity.

A contact time (washing time) between warm water and the insulating substrate 11 including thin metal wires is not particularly limited, and is preferably 1 to 600 seconds and more preferably 30 to 360 seconds, from a viewpoint of productivity.

A smoothing treatment may be performed with respect to the insulating substrate 11 including thin metal wires obtained, after the process described above, if necessary. A method of performing the smoothing treatment is not particularly limited and the smoothing treatment can be performed using a calender roll formed of a pair of rolls, for example.

Embodiment 2

In Embodiment 1 described above, as shown in FIG. 9, a first shielding electrode 20 in which, in a case where a pair of first lead-out wirings 13 of the first wiring portion 14 adjacent to each other have a gap G equal to or greater than 60 µm, a linear pattern portion 19 extending in parallel with the first lead-out wirings 13 is formed at a position corresponding to the center of the first lead-out wirings 13, can be used. The first shielding electrode 20 is a shielding electrode obtained by adding the linear pattern portion 19 formed of metal wires to the mesh-like pattern portion 18 formed of metal wires intersecting with the first lead-out wirings 13 by a predetermined angle, and the metal wires of the mesh-like pattern portion 18 and the metal wires of the linear pattern portion 19 are connected to each other.

In the same manner as described above, as shown in FIG. 10, a second shielding electrode 30 in which, in a case where a pair of second lead-out wirings 23 of the second wiring portion 24 adjacent to each other have a gap G equal to or greater than 60 µm, a linear pattern portion 29 extending in parallel with the second lead-out wirings 23 is formed at a position corresponding to the center of the second lead-out wirings 23, can be used. The second shielding electrode 30 is a shielding electrode obtained by adding the linear pattern portion 29 formed of metal wires to the mesh-like pattern portion 28 formed of metal wires intersecting with the second lead-out wirings 23 by a predetermined angle, and the metal wires of the mesh-like pattern portion 28 and the metal wires of the linear pattern portion 29 are connected to each other.

The linear pattern portions 19 and 29 preferably have a line width of 5 to 20 µm, in the same manner as that of the metal wires of the mesh-like pattern portions 18 and 28. This is because, when the linear pattern portions 19 and 29 are disposed at positions corresponding to the centers of a pair of first lead-out wirings 13 and a pair of second lead-out wirings 23 which are disposed at the gap G equal to or greater than 60 µm, gaps equal to or greater than 20 µm are generated between the side edges of the first lead-out wirings 13 and the second lead-out wirings 23 and the linear pattern portions 19 and 29.

Even when considering tolerance of the overlapping of the front surface side and the rear surface side of the insulating substrate 11, it is possible to sufficiently confirm the first lead-out wirings 13 and the second lead-out wirings 23, without overlapping the side edges of the first lead-out wirings 13 and the second lead-out wirings 23 and the linear pattern portions 19 and 29 on each other.

The linear pattern portions 19 and 29 preferably have a line width equal to or smaller than 15 µm, in order to distinguish the linear pattern portions from the first lead-out wirings 13 and the second lead-out wirings 23 having a line width of 20 to 40 µm and to further ensure visibility of the first lead-out wirings 13 and the second lead-out wirings 23.

As described above, when the first shielding electrode 20 and the second shielding electrode 30 in which the linear pattern portions 19 and 29 are added are used, it is possible to decrease sheet resistance and increase the shielding effect of the first shielding electrode 20 and the second shielding electrode 30 due to the presence of the linear pattern portions 19 and 29, while ensuring visibility of the first lead-out wirings 13 and the second lead-out wirings 23 through the openings 18a and 28a of the mesh-like pattern portions 18 and 28. In a case where such linear patterns are added, sheet resistance may vary depending on a measurement direction. In a case where the sheet resistance varies depending on a measurement direction, a value measured in a direction where the sheet resistance is minimum may be equal to or smaller than 20 Ω/sq.

A conductive film for a touch panel according to Embodiment 2 can be manufactured using the same method as that of the conductive film for a touch panel according to Embodiment 1.

In Embodiments 1 and 2 described above, the plurality of first detection electrodes 12 and the first wiring portion 14 are disposed on the front surface of the insulating substrate 11, the plurality of second detection electrodes 22 and the second wiring portion 24 are disposed on the rear surface of the insulating substrate 11, the first shielding electrode 17 or 20 corresponding to the first wiring portion 14 is formed on the rear surface of the insulating substrate 11, and the second shielding electrode 27 or 30 corresponding to the second wiring portion 24 is formed on the front surface of the insulating substrate 11, but there is no limitation.

For example, the plurality of first detection electrodes 12 and the plurality of second detection electrodes 22 are disposed on one surface side of the insulating substrate 11 with an interlayer insulating film interposed therebetween, the first wiring portion 14 and the second wiring portion 24 are disposed on the same surface side of the insulating substrate 11, and the first shielding electrode 17 or 20 and the second shielding electrode 27 or 30 are formed on the other surface side of the insulating substrate 11.

The first shielding electrode 17 or 20 and the second shielding electrode 27 or 30 may also be formed on the same side surface of the insulating substrate 11 where the first wiring portion 14 and the second wiring portion 24 are disposed, and so as to face the first wiring portion 14 and the second wiring portion 24 with an interlayer insulating film interposed therebetween.

In addition, two substrates can be provided. That is, the plurality of first detection electrodes 12 and the first wiring portion 14 are disposed on a front surface of a first insulating substrate, the first shielding electrode 17 or 20 is disposed on a rear surface thereof, the plurality of second detection electrodes 22 and the second wiring portion 24 are disposed on a front surface of a second insulating substrate, the second shielding electrode 27 or 30 is disposed on a rear surface thereof, and the first insulating substrate and the second insulating substrate can be used to be overlapped on each other.

EXAMPLES

Hereinafter, the invention will be described in detail with reference to the examples. The materials, the usage amount, the ratio, the process content, and the process procedure shown in the following examples can be suitably changed within a range not departing from the gist of the invention. Therefore, the ranges of the invention are not narrowly interpreted based on the examples shown below.

Example 1 (Preparation of Silver Halide Emulsion)

Amounts of a 2 solution and a 3 solution below corresponding to 90% were added to a 1 solution below held at 38° C. and pH of 4.5 for 20 minutes while being stirring, and nuclear particles having a diameter of 0.16 μm were formed. Then, a 4 solution and a 5 solution below were added thereto for 8 minutes, and the amounts of the remaining 10% of the 2 solution and the 3 solution below were added thereto for 2 minutes, and the particles were caused to grow to have a diameter of 0.21 μm. 0.15 g of potassium iodide was added thereto, aging was performed for 5 minutes, and particle formation was finished.

1 solution:
Water: 750 ml
Gelatin: 9 g
Sodium chloride: 3 g
1,3-dimethyl-2-thione: 20 mg
Sodium benzenethiosulfonate: 10 mg
Citric acid: 0.7 g
2 solution:
Water: 300 ml
Silver nitrate: 150 g
3 solution:
Water: 300 ml
Sodium chloride: 38 g
Potassium bromide: 32 g
Potassium hexachloroiridate (III) (0.005% of KCl and 20% of aqueous solution): 8 ml
Ammonium hexachlorinated rhodiumate (0.001% of NaCl and 20% of aqueous solution): 10 ml
4 solution:
Water: 100 ml
Silver nitrate: 50 g
5 solution:
Water: 100 ml
Sodium chloride: 13 g
Potassium bromide: 11 g
Yellow prussiate of potash: 5 mg After that, washing was performed using a flocculation method according to the usual method. Specifically, the temperature was decreased to 35° C. and pH was decreased using sulfuric acid until silver halide is precipitated (pH was in a range of 3.6±0.2). Then, approximately 3 liters of the supernatant was removed (first washing). After adding 3 liters of distilled water, sulfuric acid was added until silver halide is precipitated. 3 liters of the supernatant was removed again (second washing). The same operation as the second washing was further repeated one more time (third washing) and a washing and desalting step was finished. The pH of the emulsion after washing and desalting was adjusted to 6.4 and the pAg thereof was adjusted to 7.5, 3.9 g of gelatin, 10 mg of sodium benzenethiosulfonate, 3 mg of sodium benzenethiosulfinate, 15 mg of sodium thiosulfate, and 10 mg of chloroauric acid were added thereto, chemosensitization was performed so as to obtain optimal sensitivity at 55° C., 100 mg of 1,3,3a,7-tetraazaindene as a stabilizer and 100 mg of PROXEL (product name, manufactured by ICI Co., Ltd.) as a preservative were added thereto. The emulsion finally obtained was a iodide salt silver bromide cubic grain emulsion containing 0.08 mol % of silver iodide, in which a proportion of silver chlorobromide was set so that a proportion of silver chloride is 70 mol % and a proportion of silver bromide is 30 mol %, an average particle diameter is 0.22 μm, and a coefficient of variation is 9%.

(Preparation of Composition for Forming Photosensitive Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, and 0.90 g/mol Ag of 2,4-dichloro-6-hydroxy-1,3,5-triazine sodium salt were added to the emulsion described above, the pH of the coating solution was adjusted to 5.6 using citric acid, and a composition for forming a photosensitive layer was obtained.

(Photosensitive Layer Formation Step)

After performing corona discharge treatment with respect to an insulating substrate, a gelatin layer having a thickness of 0.1 μm as an undercoat was provided on both surfaces of the insulating substrate, and an antihalation layer containing a dye which has an optical density of approximately 1.0 and is decolored due to alkali of a developer was further provided on the undercoat. The composition for forming a photosensitive layer was applied onto the antihalation layer, a gelatin layer having a thickness of 0.15 μm was further provided, and the insulating substrate including photosensitive layers formed on both surfaces thereof was obtained. The insulating substrate including photosensitive layers formed on both surfaces thereof is set as a film A. Regarding the photosensitive layers formed, an amount of silver was 6.0 g/m$^2$ and an amount of gelatin was 1.0 g/m$^2$.

(Exposure and Development Step)

The exposure of both surfaces of the film A was performed using parallel light using a high pressure mercury lamp as a light source through a photo mask corresponding to the pattern of the first detection electrodes 12, the first lead-out wirings 13, the first external connection terminals 15, the first connector portions 16, and the second shielding electrode 27, and the pattern of the second detection electrodes 22, the second lead-out wirings 23, the second external connection terminals 25, the second connector portions 26, and the first shielding electrode 17. After the exposure, the development was performed using a developer below and a development process was performed using a fixing solution (product name: N3X-R for CN16X manufactured by Fujifilm Corporation). Then, the insulating substrate was rinsed with pure water and dried, and accordingly, an insulating substrate in which conductive members formed of Ag wires and gelatin layers are formed on both surfaces was obtained. The gelatin layers were formed between the Ag wires. The film obtained was set as a film B.

(Composition of Developer)

The following compounds are included in 1 liter (L) of the developer.

Hydroquinone: 0.037 mol/L
N-methylaminophenol: 0.016 mol/L
Sodium metaborate: 0.140 mol/L
Sodium hydroxide: 0.360 mol/L
Sodium bromide: 0.031 mol/L
Potassium metabisulfite: 0.187 mol/L (Heating Step)

The film B was placed in a superheated vapor tank at 120° C. for 130 seconds to perform the heating process. The film after the heating process was set as a film C. The film C is a conductive film for a touch panel.

As described above, a conductive film for a touch panel of Example 1 in which shielding electrodes including mesh-like pattern portions which are formed of metal wires having a line width W of 10 μm and a thickness T of 2 μm with a mesh pitch P of 100 μm were formed was manufactured.

Then, regarding the conductive film for a touch panel manufactured, the opening ratios Rm of the mesh-like pattern portions and sheet resistance of the shielding electrodes were measured.

Here, as the opening ratios Rm of the mesh-like pattern portions, proportions of areas of the openings 18a and 28a, where metal wires are not present, occupying the total area of the rectangular area K, in the rectangular area K which is surrounded by center lines of metal wires coming into contact with four sides of the rectangular openings 18a and 28a, as shown in FIG. 7, were measured. The sheet resistance of the shielding electrodes were measured by bringing an ESP type measurement probe into contact with the surface of the shielding electrodes by using a resistivity meter "LORESTA GP" manufactured by Mitsubishi Chemical Analytech Co., Ltd. In a case where an optically clear adhesive sheet (OCA) is bonded onto the surface of the shielding electrodes, it is necessary to measure the sheet resistance, in a state where the heating is performed at a temperature of approximately 60° C. and the optically clear adhesive sheet is gently peeled off.

Examples 2 to 5

Conductive films for a touch panel of Examples 2 to 5 were respectively manufactured by the same method as in Example 1, except for setting the mesh pitch P of the mesh-like pattern portion of the shielding electrode as 150 μm, 200 μm, 250 μm, and 300 μm.

Example 6

A conductive film for a touch panel of Example 6 was manufactured by the same method as in Example 1, except for setting the line width W of the metal wires as 10.55 μm, while maintaining the mesh pitch P of the mesh-like pattern portion of the shielding electrode as 100 μm.

Examples 7 and 8

Conductive films for a touch panel of Examples 7 and 8 were respectively manufactured by the same method as in Example 1, except for setting the mesh pitch P of the mesh-like pattern portion of the shielding electrode as 300 μm and setting the line width W of the metal wires as 15 μm and 20 μm.

Examples 9 to 11

Conductive films for a touch panel of Examples 9 to 11 were respectively manufactured by the same method as in Example 1, except for setting the mesh pitch P of the mesh-like pattern portion of the shielding electrode as 400 μm and setting the line width W of the metal wires as 13 μm, 15 μm, and 20 μm.

Examples 12 and 13

Conductive films for a touch panel of Examples 12 and 13 were respectively manufactured by the same method as in Example 1, except for setting the mesh pitch P of the mesh-like pattern portion of the shielding electrode as 500 μm and setting the line width W of the metal wires as 18 μm and 20 μm.

Example 14

A conductive film for a touch panel of Example 14 was manufactured by the same method as in Example 1, except for setting the line width W of the metal wires as 10.55 μm and setting the thickness T thereof as 0.76 μm, while maintaining the mesh pitch P of the mesh-like pattern portion of the shielding electrode as 100 μm.

Examples 15 and 16

Conductive films for a touch panel of Examples 15 and 16 were respectively manufactured by the same method as in Example 1, except for setting the thickness T of the metal wires as 5 µm and the line width W thereof as 10 µm and 10.55 µm, while maintaining the mesh pitch P of the mesh-like pattern portion of the shielding electrode as 100 µm.

Examples 17 to 19

Conductive films for a touch panel of Examples 17 to 19 were respectively manufactured by the same method as in Example 1, except for setting the mesh pitch P of the mesh-like pattern portion of the shielding electrode as 300 µm, the thickness T of the metal wires as 5 µm, and the line width W thereof as 10 µm, 15 µm, and 20 µm.

Examples 20 to 22

Conductive films for a touch panel of Examples 20 to 22 were respectively manufactured by the same method as in Example 1, except for setting the mesh pitch P of the mesh-like pattern portion of the shielding electrode as 400 µm, the thickness T of the metal wires as 5 µm, and the line width W thereof as 13 µm, 15 µm, and 20 µm.

Examples 23 to 26

Conductive films for a touch panel of Examples 23 to 26 were respectively manufactured by the same method as in Example 1, except for setting the mesh pitch P of the mesh-like pattern portion of the shielding electrode as 500 µm, the thickness T of the metal wires as 5 µm, and the line width W thereof as 4.65 µm, 15 µm, 17 µm, and 20 µm.

Examples 27 to 29

Conductive films for a touch panel of Examples 27 to 29 were respectively manufactured by the same method as in Example 1, except for forming the metal wires of the shielding electrode using silver paste to have the thickness T of 10 µm, setting mesh pitch P of the mesh-like pattern portion as 200 µm, and setting the line width W of the metal wires as 15 µm, 20 µm, and 21.1 µm.

Examples 30 and 31

Conductive films for a touch panel of Examples 30 and 31 were respectively manufactured by the same method as in Example 1, except for forming the metal wires of the shielding electrode using silver paste to have the thickness T of 10 µm, setting mesh pitch P of the mesh-like pattern portion as 300 µm, and setting the line width W of the metal wires as 15 µm and 20 µm.

Examples 32 and 33

Conductive films for a touch panel of Examples 32 and 33 were respectively manufactured by the same method as in Example 1, except for forming the metal wires of the shielding electrode using silver paste to have the thickness T of 10 µm, setting mesh pitch P of the mesh-like pattern portion as 400 µm, and setting the line width W of the metal wires as 15 µm and 20 µm.

Examples 34 and 35

Conductive films for a touch panel of Examples 34 and 35 were respectively manufactured by the same method as in Example 1, except for forming the metal wires of the shielding electrode using silver paste to have the thickness T of 10 µm, setting mesh pitch P of the mesh-like pattern portion as 500 µm, and setting the line width W of the metal wires as 15 µm and 20 µm.

Example 36

A conductive film for a touch panel of Example 36 was manufactured by the same method as in Example 1, except for setting the mesh pitch P of the mesh-like pattern portion of the shielding electrode as 330 µm.

Example 37

Figure 9:
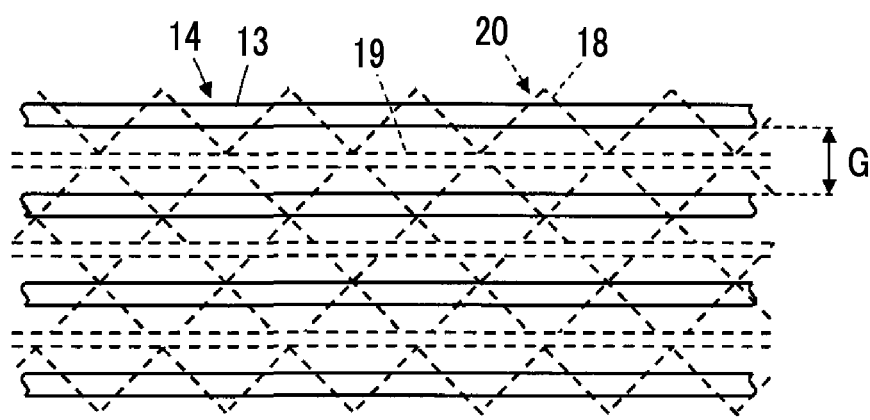
FIG. 9 is a partial plan view showing a relationship between a first wiring portion and a first shielding electrode of a conductive film for a touch panel according to Embodiment 2.
Figure 10:
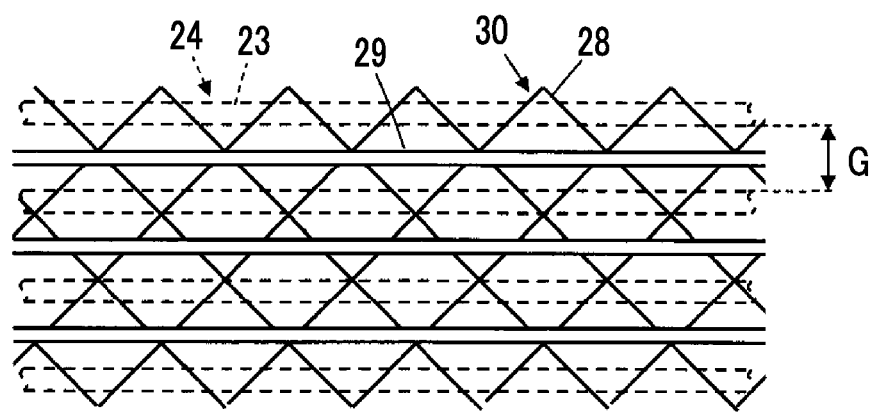
FIG. 10 is a partial plan view showing a relationship between a second wiring portion and a second shielding electrode of the conductive film for a touch panel according to Embodiment 2.

A conductive film for a touch panel of Example 37 was manufactured by the same method as in Example 1, except for setting the mesh pitch P of the mesh-like pattern portion of the shielding electrode as 400 µm and forming a linear pattern portion having a line width of 15 µm at a position corresponding to the center of a pair of lead-out wirings disposed at the gap G equal to or greater than 60 µm, as in Embodiment 2 shown in FIGS. 9 and 10.

Example 38

A conductive film for a touch panel of Example 38 was manufactured by the same method as in Example 1, except for setting the mesh pitch P of the mesh-like pattern portion of the shielding electrode as 500 µm and forming a linear pattern portion having a line width of 15 µm at a position corresponding to the center of a pair of lead-out wirings disposed at the gap G equal to or greater than 60 µm, as in Embodiment 2.

Comparative Examples 1 to 3

Conductive films for a touch panel of Comparative Examples 1 to 3 were respectively manufactured by the same method as in Example 1, except for setting the mesh pitch P of the mesh-like pattern portion of the shielding electrode as 50 µm, 400 µm, and 500 µm.

Comparative Examples 4 and 5

Conductive films for a touch panel of Comparative Examples 4 and 5 were respectively manufactured by the same method as in Example 1, except for setting the line width W of the metal wires as 15 µm and 20 µm, while maintaining the mesh pitch P of the mesh-like pattern portion of the shielding electrode as 100 µm.

Comparative Example 6

A conductive film for a touch panel of Comparative Example 6 was manufactured by the same method as in Example 1, except for setting the mesh pitch P of the mesh-like pattern portion of the shielding electrode as 500 µm and setting the line width W of the metal wires as 15 µm.

Comparative Examples 7 to 9

Conductive films for a touch panel of Comparative Examples 7 to 9 were respectively manufactured by the same method as in Example 1, except for setting the mesh pitch P of the mesh-like pattern portion of the shielding electrode as 100 µm, the thickness T of the metal wires as 0.76 µm, and the line width W of the metal wires as 10 µm, 15 µm, and 20 µm.

Comparative Examples 10 to 12

Conductive films for a touch panel of Comparative Examples 10 to 12 were respectively manufactured by the same method as in Example 1, except for setting the mesh pitch P of the mesh-like pattern portion of the shielding electrode as 300 µm, the thickness T of the metal wires as 0.76 µm, and the line width W of the metal wires as 10 µm, 15 µm, and 20 µm.

Comparative Examples 13 to 16

Conductive films for a touch panel of Comparative Examples 13 to 16 were respectively manufactured by the same method as in Example 1, except for setting the mesh pitch P of the mesh-like pattern portion of the shielding electrode as 400 µm, the thickness T of the metal wires as 0.76 µm, and the line width W of the metal wires as 10 µm, 13 µm, 15 µm, 20 µm.

Comparative Examples 17 to 20

Conductive films for a touch panel of Comparative Examples 17 to 20 were respectively manufactured by the same method as in Example 1, except for setting the mesh pitch P of the mesh-like pattern portion of the shielding electrode as 500 m, the thickness T of the metal wires as 0.76 µm, and the line width W of the metal wires as 10 µm, 15 µm, 18 µm, and 20 µm.

Comparative Example 21

A conductive film for a touch panel of Comparative Example 21 was manufactured by the same method as in Example 1, except for setting the mesh pitch P of the mesh-like pattern portion of the shielding electrode as 100 µm, the thickness T of the metal wires as 5 µm, and the line width W thereof as 15 µm.

Comparative Example 22

A conductive film for a touch panel of Comparative Example 22 was manufactured by the same method as in Example 1, except for setting the mesh pitch P of the mesh-like pattern portion of the shielding electrode as 500 µm, the thickness T of the metal wires as 5 µm, and the line width W thereof as 3 µm.

Comparative Example 23 and 24

Conductive films for a touch panel of Comparative Example 23 and 24 were respectively manufactured by the same method as in Example 1, except for forming the metal wires of the shielding electrode using silver paste to have the thickness T of 10 µm, setting mesh pitch P of the mesh-like pattern portion as 100 µm, and setting the line width W of the metal wires as 15 µm and 20 µm.

Regarding the conductive film for a touch panel of Examples 1 to 5 and Comparative Examples 1 to 3, the opening ratio Rm of the mesh-like pattern portion shown in FIG. 7 and sheet resistance of the shielding electrode were respectively measured and the shielding effect was estimated. The results are shown in Table 1. In the conductive film for a touch panel of Examples 1 to 5 and Comparative Example 1 to 3, the shielding electrode is formed of only the mesh-like pattern portion, without providing the linear pattern portion shown in Embodiment 2, and accordingly, the opening ratio Rm of the mesh-like pattern portion is equivalent to the opening ratio of the entire shielding electrode and sheet resistance of the mesh-like pattern portion is equivalent to sheet resistance of the entire shielding electrode.

[Table 1]

TABLE 1

| | Mesh pitch µm | Metal wire line width µm | Metal wire thickness µm | Opening ratio Rm % | Sheet resistance Ω/sq | Shielding effect calculated value dB | Evaluation result |
|---|---|---|---|---|---|---|---|
| Example 1 | 100 | 10 | 2 | 81 | 8.11 | 51.14 | OK |
| Example 2 | 150 | 10 | 2 | 87.1 | 9.76 | 50.98 | OK |
| Example 3 | 200 | 10 | 2 | 90.3 | 12.56 | 50.71 | OK |
| Example 4 | 250 | 10 | 2 | 92.2 | 16.4 | 50.37 | OK |
| Example 5 | 300 | 10 | 2 | 93.4 | 19.76 | 50.1 | OK |
| Comparative Example 1 | 50 | 10 | 2 | 64 | 3.73 | 51.64 | NG |
| Comparative Example 2 | 400 | 10 | 2 | 95.1 | 26.43 | 49.6 | NG |
| Comparative Example 3 | 500 | 10 | 2 | 96 | 33.12 | 49.16 | NG |

Figure 11:
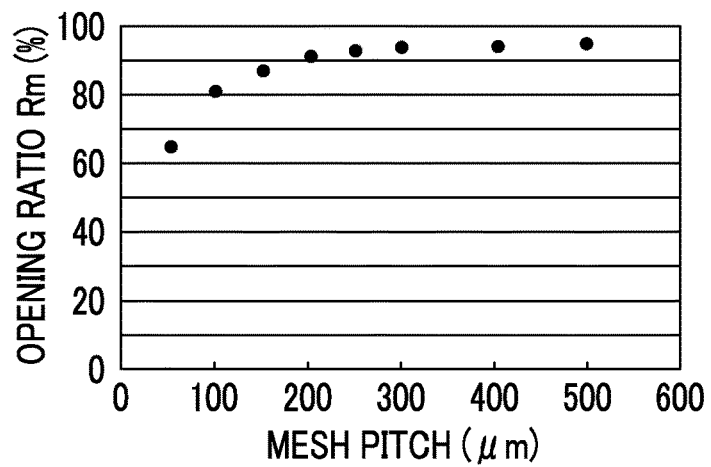
FIG. 11 is a graph showing a relationship between a mesh pitch and an opening ratio of the shielding electrode.
Figure 12:
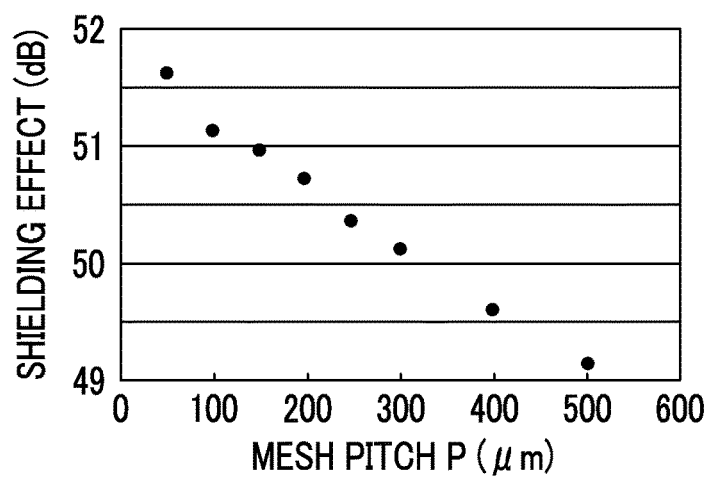
FIG. 12 is a graph showing a relationship between a mesh pitch and a shielding effect of the shielding electrode.

Examples 1 to 5 and Comparative Example 1 to 3 are examples in which only the mesh pitch P of the mesh-like pattern portion was changed, while respectively maintaining the line width W and the thickness T of the metal wires of the shielding electrode as constant values, and therefore, a result was obtained in that, as the mesh pitch P increases, the opening ratio Rm of the mesh-like pattern portion increases, as shown in FIG. 11. In addition, a result was obtained in that, as the mesh pitch P increases, the sheet resistance decreases, and thus, an estimated value of the shielding effect decreases, as shown in FIG. 12.

Here, when the opening ratio Rm of the mesh-like pattern portion of the shielding electrode is equal to or greater than 80% and an estimated value of the shielding effect is equal to or greater than 50 dB, an evaluation result is set as "OK".

In the conductive films for a touch panel of Examples 1 to 5, the opening ratio Rm of the mesh-like pattern portion is equal to or greater than 80%, the sheet resistance was equal to or smaller than 20 Ω/sq, the estimated value of the shielding effect was equal to or greater than 50 dB, and accordingly, an evaluation result of "OK" was obtained. That is, it was determined that it is possible to obtain a required shielding effect, while ensuring visibility of the lead-out wirings through the openings of the mesh-like pattern portion of the shielding electrode.

With respect to this, in the conductive film for a touch panel of Comparative Example 1, the sheet resistance was equal to or smaller than 20 Ω/sq, but the opening ratio Rm of the mesh-like pattern portion was less than 80%, and accordingly, visibility of the lead-out wirings was decreased. In the conductive films for a touch panel of Comparative Examples 2 and 3, the opening ratio Rm of the mesh-like pattern portion was equal to or greater than 80%, but the sheet resistance exceeded 20 Ω/sq, and accordingly, an estimated value of the shielding effect was less than 50 dB. Thus, evaluation results of Comparative Examples 1 to 3 were "NG".

Next, regarding the conductive film for a touch panel of Examples 6 to 14 and Comparative Examples 4 to 20, the opening ratio Rm of the mesh-like pattern portion and sheet resistance of the shielding electrode were respectively measured, the shielding effect was estimated, and results shown in Table 2 were obtained. Also in Examples 6 to 14 and Comparative Examples 4 to 20, the opening ratio Rm of the mesh-like pattern portion is equivalent to the opening ratio of the entire shielding electrode and sheet resistance of the mesh-like pattern portion is equivalent to sheet resistance of the entire shielding electrode.

TABLE 2

| | Mesh pitch μm | Metal wire line width μm | Metal wire thickness μm | Opening ratio Rm % | Sheet resistance Ω/sq | Shielding effect calculated value dB | Evaluation result |
|---|---|---|---|---|---|---|---|
| Example 6 | 100 | 10.55 | 2 | 80 | 7.56 | 51.2 | OK |
| Example 7 | 300 | 15 | 2 | 90.3 | 13.69 | 50.61 | OK |
| Example 8 | 300 | 20 | 2 | 87.1 | 10.63 | 50.89 | OK |
| Example 9 | 400 | 13 | 2 | 93.6 | 20 | 50 | OK |
| Example 10 | 400 | 15 | 2 | 92.6 | 18.36 | 50.21 | OK |
| Example 11 | 400 | 20 | 2 | 90.3 | 14.28 | 50.56 | OK |
| Example 12 | 500 | 18 | 2 | 93.3 | 20 | 50 | OK |
| Example 13 | 500 | 20 | 2 | 92.2 | 17.94 | 50.25 | OK |
| Example 14 | 100 | 10.55 | 0.76 | 80 | 20 | 50 | OK |
| Comparative Example 4 | 100 | 15 | 2 | 72.3 | 4.36 | 51.56 | NG |
| Comparative Example 5 | 100 | 20 | 2 | 64 | 3.35 | 51.69 | NG |
| Comparative Example 6 | 500 | 15 | 2 | 94.1 | 23.03 | 49.85 | NG |
| Comparative Example 7 | 100 | 10 | 0.76 | 81 | 20.92 | 49.96 | NG |
| Comparative Example 8 | 100 | 15 | 0.76 | 72.3 | 11.29 | 50.25 | NG |
| Comparative Example 9 | 100 | 20 | 0.76 | 64 | 8.64 | 50.34 | NG |
| Comparative Example 10 | 300 | 10 | 0.76 | 93.4 | 50.99 | 49.16 | NG |
| Comparative Example 11 | 300 | 15 | 0.76 | 90.3 | 35.34 | 49.56 | NG |
| Comparative Example 12 | 300 | 20 | 0.76 | 87.1 | 27.44 | 49.77 | NG |
| Comparative Example 13 | 400 | 10 | 0.76 | 95.1 | 68.2 | 48.76 | NG |
| Comparative Example 14 | 400 | 13 | 0.76 | 93.6 | 51.61 | 49.14 | NG |
| Comparative Example 15 | 400 | 15 | 0.76 | 92.6 | 47.39 | 49.25 | NG |
| Comparative Example 16 | 400 | 20 | 0.76 | 90.3 | 36.86 | 49.52 | NG |
| Comparative Example 17 | 500 | 10 | 0.76 | 96 | 85.47 | 48.39 | NG |
| Comparative Example 18 | 500 | 15 | 0.76 | 94.1 | 59.44 | 48.96 | NG |
| Comparative Example 19 | 500 | 18 | 0.76 | 93.3 | 53.26 | 48.1 | NG |
| Comparative Example 20 | 500 | 20 | 0.76 | 92.2 | 46.29 | 49.27 | NG |

Examples 6 to 13 are examples in which the mesh pitch P of the mesh-like pattern portion was variously changed as 100 μm, 300 μm, 400 μm, and 500 μm, and the line width W of the metal wires of the shielding electrode was variously changed within a range of 10.55 μm to 20 μm, while fixing the thickness T of the metal wires of the shielding electrode as 2 μm. The opening ratio Rm of the mesh-like pattern portion was equal to or greater than 80%, the sheet resistance was equal to or smaller than 20 Ω/sq, the estimated value of the shielding effect was equal to or greater than 50 dB, and accordingly, an evaluation result of "OK" was obtained.

Meanwhile, Comparative Examples 4 to 6 are examples in which the mesh pitch P of the mesh-like pattern portion was set as 100 μm or 500 μm and the line width W of the metal wires of the shielding electrode was set as 15 μm or 20 μm, while setting the thickness T of the metal wires of the shielding electrode as 2 μm, in the same manner as in Examples 6 to 13. However, in Comparative Examples 4 and 5, the sheet resistance of the shielding electrodes was equal to or smaller than 20 Ω/sq, but the opening ratio Rm of the mesh-like pattern portion was less than 80%, and in Comparative Example 6, the opening ratio Rm of the mesh-like pattern portion was equal to or greater than 80%, but the sheet resistance of the shielding electrodes exceeded 20 Ω/sq, and accordingly, an estimated value of the shielding effect was less than 50 dB. Thus, evaluation results of Comparative Examples 4 to 6 were "NG".

Figure 13:
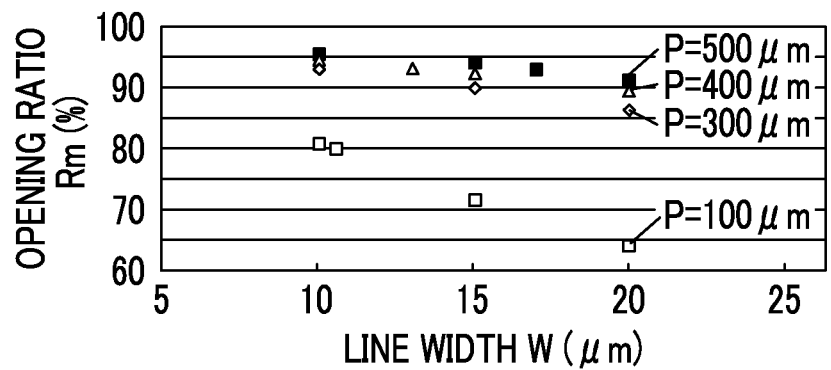
FIG. 13 is a graph showing a relationship between a line width of metal wires and an opening ratio of the shielding electrode.
Figure 14:
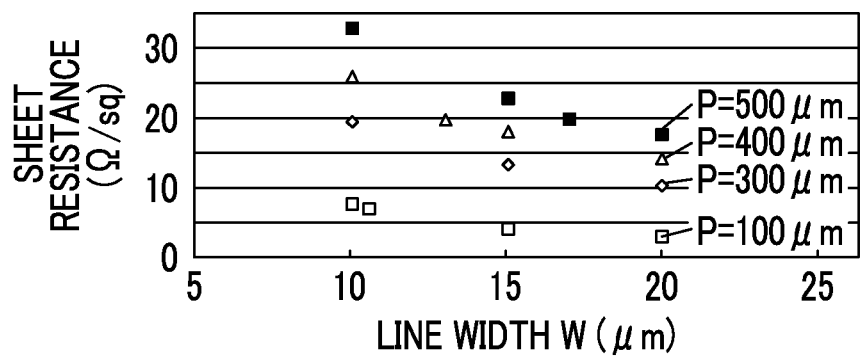
FIG. 14 is a graph showing a relationship between a line width of metal wires and sheet resistance of the shielding electrode.
Figure 15:
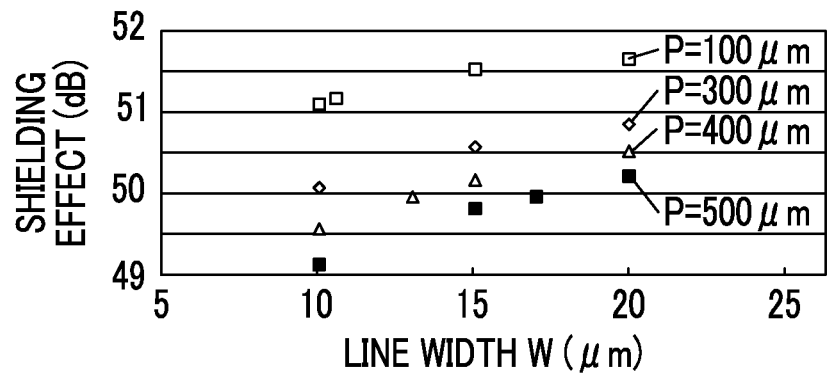
FIG. 15 is a graph showing a relationship between a line width of metal wires and a shielding effect of the shielding electrode.

In the 15 conductive films for a touch panel in total including Examples 1 and 5 to 13 and Comparative Examples 2 to 6 in which the thickness T of the metal wires of the shielding electrode was set as 2 μm, a relationship between the line width W of the metal wires of the shielding electrode and the opening ratio of the shielding electrode is shown in FIG. 13, a relationship between the line width W of the metal wires and the sheet resistance is shown in FIG. 14, and a relationship between the line width W of the metal wires and the estimated value of the shielding effect is shown in FIG. 15.

When the opening ratio Rm of the mesh-like pattern portion is equal to or greater than 80%, the sheet resistance is equal to or smaller than 20 Ω/sq, and the estimated value of the shielding effect is equal to or greater than 50 dB, an evaluation result of "OK" is obtained.

In Example 14, the thickness T of the metal wires of the shielding electrode was set as 0.76 μm, but the mesh pitch P of the mesh-like pattern portion was set as 100 μm and the line width W of the metal wires of the shielding electrode was set as 10.55 μm. Accordingly, the opening ratio Rm of the mesh-like pattern portion was 80.0%, the sheet resistance was 20.00 Ω/sq, and the estimated value of the shielding effect was 50.00 dB. Therefore, an evaluation result of "OK" is obtained.

With respect to this, Comparative Example 7 to 20 are examples in which the thickness T of the metal wires of the shielding electrode was set as 0.76 μm in the same manner as in Example 14, the mesh pitch P of the mesh-like pattern portion was variously changed as 100 μm, 300 μm, 400 μm, and 500 μm, and the line width W of the metal wires of the shielding electrode was variously changed within a range of 10 μm to 20 μm. In Comparative Example 8 and 9, the opening ratio Rm of the mesh-like pattern portion was less than 80%, in Comparative Example 7 and 10 to 20, the sheet resistance exceeded 20 Ω/sq, and accordingly, the estimated value of the shielding effect was less than 50 dB. Thus, evaluation results of all of these comparative examples were "NG".

Figure 16:
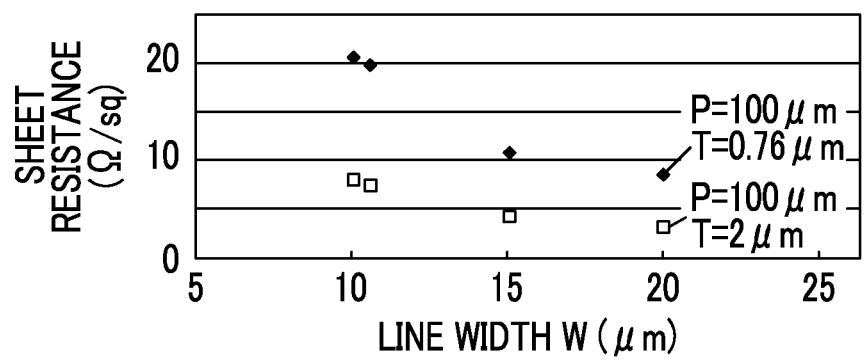
FIG. 16 is a graph showing a relationship between a line width of metal wires, when a thickness of metal wires is changed, and sheet resistance of the shielding electrode.
Figure 17:
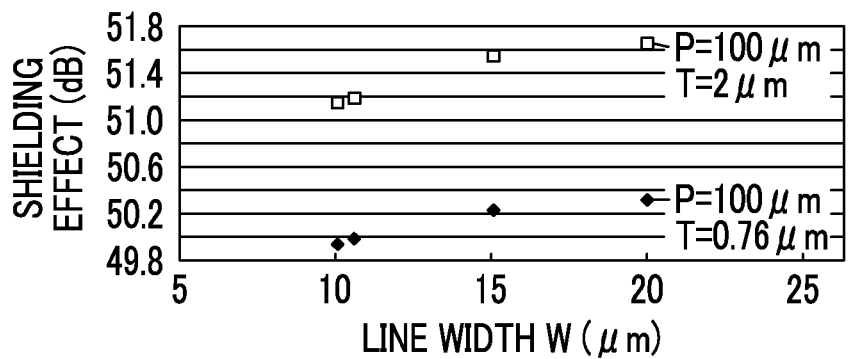
FIG. 17 is a graph showing a relationship between a line width of metal wires, when a thickness of metal wires is changed, and a shielding effect of the shielding electrode.

In the 8 conductive films for a touch panel in total including Examples 1 and 6 and Comparative Examples 4 and 5 in which the mesh pitch P of the mesh-like pattern portion was set as 100 μm and the thickness T of the metal wires of the shielding electrode was set as 2 μm, and Example 14 and Comparative Examples 7 to 9 in which the mesh pitch P of the mesh-like pattern portion was set as 100 μm and the thickness T of the metal wires of the shielding electrode was set as 0.76 μm, a relationship between the line width W of the metal wires and the sheet resistance is shown in FIG. 16, and a relationship between the line width W of the metal wires of the shielding electrode and the estimated value of the shielding effect is shown in FIG. 17.

It is found that, when the thickness T of the metal wires of the shielding electrode is decreased from 2 μm to 0.76 μm, the sheet resistance of the shielding electrode increases, regardless of the line width W of the metal wires, and accordingly, the estimated value of the shielding effect decreases.

Regarding the conductive film for a touch panel of Examples 15 to 26 and Comparative Examples 21 and 22, the opening ratio Rm of the mesh-like pattern portion and sheet resistance of the shielding electrode were respectively measured, and the results are shown in Table 3. Also in Examples 15 to 26 and Comparative Examples 21 and 22, the opening ratio Rm of the mesh-like pattern portion is equivalent to the opening ratio of the entire shielding electrode and sheet resistance of the mesh-like pattern portion is equivalent to sheet resistance of the entire shielding electrode.

TABLE 3

|  | Mesh pitch μm | Metal wire line width μm | Metal wire thickness μm | Opening ratio Rm % | Sheet resistance Ω/sq | Evaluation result |
|---|---|---|---|---|---|---|
| Example 15 | 100 | 10 | 5 | 81 | 3.24 | OK |
| Example 16 | 100 | 10.55 | 5 | 80.1 | 3.03 | OK |
| Example 17 | 300 | 10 | 5 | 93.4 | 7.9 | OK |
| Example 18 | 300 | 15 | 5 | 90.3 | 5.48 | OK |
| Example 19 | 300 | 20 | 5 | 87.1 | 4.25 | OK |
| Example 20 | 400 | 13 | 5 | 93.6 | 8 | OK |
| Example 21 | 400 | 15 | 5 | 92.6 | 7.34 | OK |
| Example 22 | 400 | 20 | 5 | 90.3 | 5.71 | OK |
| Example 23 | 500 | 4.65 | 5 | 98.2 | 20.03 | OK |
| Example 24 | 500 | 15 | 5 | 94.1 | 9.21 | OK |
| Example 25 | 500 | 17 | 5 | 93.3 | 8 | OK |
| Example 26 | 500 | 20 | 5 | 92.2 | 7.17 | OK |
| Comparative Example 21 | 100 | 15 | 5 | 72.3 | 1.75 | NG |
| Comparative Example 22 | 500 | 3 | 5 | 98.8 | 22.6 | NG |

Examples 15 to 26 are examples in which the mesh pitch P of the mesh-like pattern portion was variously changed as 100 μm, 300 μm, 400 μm, and 500 μm, and the line width W of the metal wires of the shielding electrode was variously changed within a range of 4.65 μm to 20 μm, while fixing the thickness T of the metal wires of the shielding electrode as 5 μm. The opening ratio Rm of the mesh-like pattern portion was equal to or greater than 80%, the sheet resistance was equal to or smaller than 20 Ω/sq, and accordingly, an evaluation result of "OK" was obtained.

Meanwhile, Comparative Examples 21 and 22 are examples in which the mesh pitch P of the mesh-like pattern portion was set as 100 μm or 500 μm and the line width W of the metal wires of the shielding electrode was set as 15 μm or 3 μm, while setting the thickness T of the metal wires of the shielding electrode as 5 μm, in the same manner as in Examples 15 to 26. However, in Comparative Example 21, the sheet resistance of the shielding electrodes was equal to or smaller than 20 Ω/sq, but the opening ratio Rm of the mesh-like pattern portion was less than 80%, and in Comparative Example 22, the opening ratio Rm of the mesh-like pattern portion was equal to or greater than 80%, but the sheet resistance of the shielding electrodes exceeded 20 Ω/sq, and accordingly, evaluation results of Comparative Examples 21 and 22 were "NG".

Regarding the conductive film for a touch panel of Examples 27 to 35 and Comparative Examples 23 and 24, the opening ratio Rm of the mesh-like pattern portion and sheet resistance of the shielding electrode were respectively measured, and results shown in Table 4 were obtained. Also in Examples 27 to 35 and Comparative Examples 23 and 24, the opening ratio Rm of the mesh-like pattern portion is equivalent to the opening ratio of the entire shielding electrode and sheet resistance of the mesh-like pattern portion is equivalent to sheet resistance of the entire shielding electrode.

TABLE 4

|  | Mesh pitch μm | Metal wire line width μm | Metal wire thickness μm | Opening ratio Rm % | Sheet resistance Ω/sq | Evaluation result |
|---|---|---|---|---|---|---|
| Example 27 | 200 | 15 | 10 | 85.6 | 0.87 | OK |
| Example 28 | 200 | 20 | 10 | 81 | 0.67 | OK |
| Example 29 | 200 | 21.1 | 10 | 80 | 0.66 | OK |
| Example 30 | 300 | 15 | 10 | 90.3 | 1.37 | OK |
| Example 31 | 300 | 20 | 10 | 87.1 | 1.06 | OK |
| Example 32 | 400 | 15 | 10 | 92.6 | 1.84 | OK |
| Example 33 | 400 | 20 | 10 | 90.3 | 1.43 | OK |
| Example 34 | 500 | 15 | 10 | 94.1 | 2.3 | OK |
| Example 35 | 500 | 20 | 10 | 92.2 | 1.79 | OK |
| Comparative Example 23 | 100 | 15 | 10 | 72.3 | 0.44 | NG |
| Comparative Example 24 | 100 | 20 | 10 | 64 | 0.33 | NG |

Examples 27 to 35 are examples in which the metal wires of the shielding electrode were formed using silver paste to have the thickness T of 10 μm, the mesh pitch P of the mesh-like pattern portion was variously changed as 200 μm, 300 μm, 400 μm, and 500 μm, and the line width W of the metal wires of the shielding electrode was variously changed within a range of 15 μm to 20 μm. The opening ratio Rm of the mesh-like pattern portion was equal to or greater than 80%, the sheet resistance was equal to or smaller than 20 Ω/sq, and accordingly, an evaluation result of "OK" was obtained. Particularly, by forming the metal wires of the shielding electrode using silver paste to have the thickness T of 10 μm, the sheet resistance significantly decreases and a great shielding effect can be realized.

Meanwhile, Comparative Examples 23 and 24 are examples in which the metal wires of the shielding electrode were formed using silver paste to have the thickness T of 10 μm, in the same manner as in Examples 27 to 35, the mesh pitch P of the mesh-like pattern portion was set as 100 μm, and the line width W of the metal wires of the shielding electrode was set as 15 μm or 20 μm. However, in Comparative Examples 23 and 24, the sheet resistance of the shielding electrodes was equal to or smaller than 20 Ω/sq, but line width W of the metal wires having the mesh pitch P was excessively great, and accordingly, the opening ratio Rm of the mesh-like pattern portion was less than 80%. Thus, an evaluation result was "NG".

Regarding the conductive film for a touch panel of Examples 36 to 38, the opening ratio and the sheet resistance of the shielding electrode were respectively measured, the shielding effect was estimated, and results shown in Table 5 were obtained.

TABLE 5

|  | Mesh pitch μm | Metal wire line width μm | Metal wire thickness μm | Linear pattern width μm | Opening ratio Rm % | Sheet resistance Ω/sq | Shielding effect calculated value dB | Evaluation result |
|---|---|---|---|---|---|---|---|---|
| Example 36 | 330 | 10 | 2 | None | 94 | 20 | 50 | OK |
| Example 37 | 400 | 10 | 2 | 15 | 95.1 | 2.41 | 51.81 | OK |
| Example 38 | 500 | 10 | 2 | 15 | 96 | 2.47 | 51.8 | OK |

Example 36 is an example in which the mesh pitch P of the mesh-like pattern portion was set as 330 μm, so as that the sheet resistance of the shielding electrodes becomes 20 Ω/sq and the estimated value of the shielding effect becomes 50 dB, in a state where the line width W of the metal wires of the shielding electrode was set as 10 μm and the thickness T of the metal wires was set as 2 μm, in the same manner as in Examples 1 to 5 and Comparative Examples 1 to 3. In a case where the line width W of the metal wires of the shielding electrode is set as 10 μm and the thickness T of the metal wires is set as 2 μm, when the mesh pitch P of the mesh-like pattern portion exceeds 330 μm, the sheet resistance of the shielding electrodes exceeds 20 Ω/sq and the estimated value of the shielding effect becomes less than 50 dB, and an evaluation result become "NG", as in Comparative Examples 2 and 3 shown in Table 1.

However, it is found that, even when the mesh pitch P of the mesh-like pattern portion is 400 μm or 500 μm which is greater than 330 μm, as in Examples 37 and 38, when the linear pattern portion having a line width of 15 μm is added at a position corresponding to the center of a pair of lead-out wirings disposed at the gap G equal to or greater than 60 μm, as in Embodiment 2 shown in FIGS. 9 and 10, the sheet resistance of the shielding electrode including both of the mesh-like pattern portion and the linear pattern portion is significantly decreased from 20 Ω/sq, the estimated value of the shielding effect is equal to or greater than 50 dB, and the high shielding effect is expected. In Examples 37 and 38, the opening ratio Rm of the mesh-like pattern portion is equal to or greater than 80% and an evaluation result of "OK" was obtained.

In Examples 37 and 38, the linear pattern portion having a line width 15 μm is added. Since the linear pattern portion is disposed at a position corresponding to the center of a pair of lead-out wirings disposed at the gap G equal to or greater than 60 μm, a gap equal to or greater than 22.5 μm is generated between the side edge of the lead-out wirings and the linear pattern portion. Accordingly, as shown in FIG. 8, when a unit area U having a width from the side edge of the lead-out wirings to a portion separated therefrom to the outer side by 15 μm, and a length of 300 μm along a length direction of the lead-out wirings is assumed, the linear pattern portion is not present in the unit area U, and the opening ratio Rm of the mesh-like pattern portion is equal to or greater than 80%, visibility of the lead-out wirings is ensured.

Figure 18:
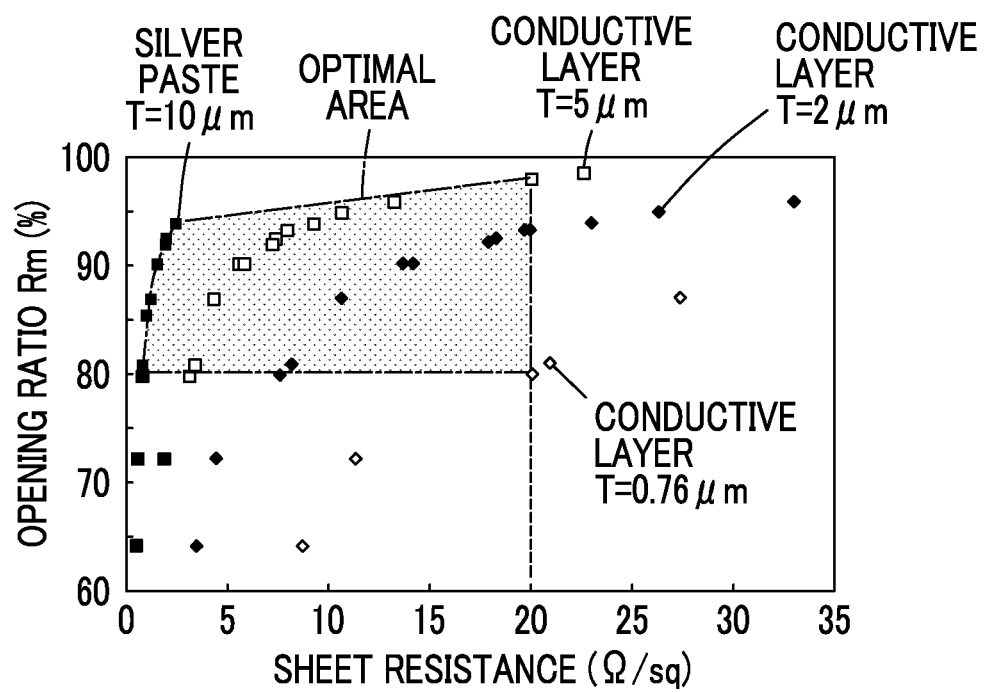
FIG. 18 is a graph showing a relationship between sheet resistance and an opening ratio of the shielding electrode.
Figure 19:
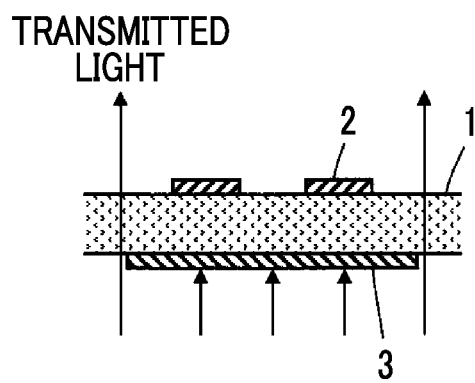
FIG. 19 is a partial cross section view showing a state of shape inspection of lead-out wirings of wiring portions of a conductive film for a touch panel of the related art.

Among Examples 1 to 35 and Comparative Examples 1 to 24, a relationship between sheet resistance and the opening ratio Rm regarding the conductive films for a touch panel of Examples 1 and 5 to 35 and Comparative Examples 4 to 9, 12, and 21 to 24 in which the opening ratio Rm of the mesh-like pattern portion is equal to or greater than 60% and sheet resistance of the shielding electrode is equal to or smaller than 35 Ω/sq, is shown in FIG. 18.

When conductive films for a touch panel having the mesh pitch P of the mesh-like pattern portion, and the line width W and the thickness T of the metal wires of the shielding electrode which are in an optimal area showing the opening ratio Rm which is equal to or greater than 80% and sheet resistance which is equal to or smaller than 20 Ω/sq, are used, it is possible to obtain a shielding effect equal to or greater than 50 dB while ensuring visibility of the lead-out wirings.

EXPLANATION OF REFERENCES

11: insulating substrate
12: first detection electrode
12a, 22a: thin metal wire
13: first lead-out wiring
14: first wiring portion
15: first external connection terminal
16: first connector portion
17, 20: first shielding electrode
18, 28: mesh-like pattern portion
18a, 28a: opening
19, 29: linear pattern portion
22: second detection electrode
23: second lead-out wiring
24: second wiring portion
25: second external connection terminal
26: second connector portion
27: second shielding electrode
S1: sensing area
S2: peripheral area
D1: first direction
D2: second direction
K: rectangular area
U: unit area

What is claimed is:
1. A conductive film for a touch panel comprising:
an insulating substrate including a pair of surfaces facing each other;
a detection electrode pattern portion which is formed of thin metal wires formed on at least one surface of the pair of surfaces of the insulating substrate;
a wiring portion which is disposed on the same surface as the surface of the insulating substrate where the detection electrode pattern portion is formed, and includes a plurality of lead-out wirings formed of metal which are connected to the detection electrode pattern portion; and
a shielding electrode formed of metal which is disposed on a surface on a side opposite to the surface of the insulating substrate where the wiring portion is disposed and at a position corresponding to the wiring portion,
wherein the shielding electrode includes a mesh-like pattern portion which is formed of metal wires respectively intersecting with the lead-out wirings of the wiring portion and has an opening ratio equal to or greater than 80%, and has sheet resistance equal to or smaller than 20 Ω/sq, and the shielding electrode has an opening ratio in a unit area having a width of 15 μm from the side edge of the lead-out wirings to a portion of the outer side and a length of 300 μm along the lead-out wirings which is greater than 80%.

2. The conductive film for a touch panel according to claim 1,
wherein the metal wires configuring the mesh-like pattern portion have a line width smaller than a line width of each of the lead-out wirings of the wiring portion.

3. The conductive film for a touch panel according to claim 1,
wherein the metal wires configuring the mesh-like pattern portion have a line width greater than a line width of the thin metal wires forming the detection electrode pattern portion.

4. The conductive film for a touch panel according to claim 2,
wherein the metal wires configuring the mesh-like pattern portion have a line width greater than a line width of the thin metal wires forming the detection electrode pattern portion.

5. The conductive film for a touch panel according to claim 1,
wherein the metal wires configuring the mesh-like pattern portion have a line width of 5 to 20 μm.

6. The conductive film for a touch panel according to claim 2,
wherein the metal wires configuring the mesh-like pattern portion have a line width of 5 to 20 μm.

7. The conductive film for a touch panel according to claim 3,
wherein the metal wires configuring the mesh-like pattern portion have a line width of 5 to 20 μm.

8. The conductive film for a touch panel according to claim 4,
wherein the metal wires configuring the mesh-like pattern portion have a line width of 5 to 20 μm.

9. The conductive film for a touch panel according to claim 1,
wherein, the plurality of lead-out wirings includes a pair of lead-out wirings disposed adjacent to each other with a gap therebetween, and
wherein, in a case where the gap between the pair of lead-out wirings is equal to or greater than 60 μm, the shielding electrode includes a linear pattern portion extending in parallel with the pair of lead-out wirings and disposed at a position corresponding to the center of the pair of lead-out wirings.

10. The conductive film for a touch panel according to claim 2,
wherein, the plurality of lead-out wirings includes a pair of lead-out wirings disposed adjacent to each other with a gap therebetween, and
wherein, in a case where the gap between the pair of lead-out wirings is equal to or greater than 60 μm, the shielding electrode includes a linear pattern portion extending in parallel with the pair of lead-out wirings and disposed at a position corresponding to the center of the pair of lead-out wirings.

11. The conductive film for a touch panel according to claim 3,
wherein, the plurality of lead-out wirings includes a pair of lead-out wirings disposed adjacent to each other with a gap therebetween, and
wherein, in a case where the gap between the pair of lead-out wirings is equal to or greater than 60 μm, the shielding electrode includes a linear pattern portion extending in parallel with the pair of lead-out wirings and disposed at a position corresponding to the center of the pair of lead-out wirings.

12. The conductive film for a touch panel according to claim 5,
wherein, the plurality of lead-out wirings includes a pair of lead-out wirings disposed adjacent to each other with a gap therebetween, and
wherein, in a case where the gap between the pair of lead-out wirings is equal to or greater than 60 μm, the shielding electrode includes a linear pattern portion extending in parallel with the pair of lead-out wirings and disposed at a position corresponding to the center of the pair of lead-out wirings.

13. The conductive film for a touch panel according to claim 9,
wherein the linear pattern portion is formed of metal wires having a width of 5 to 15 μm.

14. The conductive film for a touch panel according to claim 10,
wherein the linear pattern portion is formed of metal wires having a width of 5 to 15 μm.

15. The conductive film for a touch panel according to claim 11,
wherein the linear pattern portion is formed of metal wires having a width of 5 to 15 μm.

16. The conductive film for a touch panel according to claim 12,
wherein the linear pattern portion is formed of metal wires having a width of 5 to 15 μm.

17. The conductive film for a touch panel according to claim 1,
wherein the detection electrode pattern portion and the wiring portion are respectively formed on a front surface and a rear surface of the insulating substrate,
the shielding electrode corresponding to respective lead-out wirings of the wiring portion formed on the front surface of the insulating substrate is formed on the rear surface of the insulating substrate, and
the shielding electrode corresponding to respective lead-out wirings of the wiring portion formed on the rear surface of the insulating substrate is formed on the front surface of the insulating substrate.

18. The conductive film for a touch panel according to claim 17,
wherein the shielding electrode has a thickness which is the same as that of the detection electrode pattern portion formed on the same surface of the insulating substrate.

19. The conductive film for a touch panel according to claim 17,
wherein the shielding electrode is formed of a material which is the same as that of the detection electrode pattern portion formed on the same surface of the insulating substrate.

20. The conductive film for a touch panel according to claim 18,
wherein the shielding electrode is formed of a material which is the same as that of the detection electrode pattern portion formed on the same surface of the insulating substrate.

* * * * *